(12) United States Patent
Jairazbhoy et al.

(10) Patent No.: US 8,197,203 B2
(45) Date of Patent: Jun. 12, 2012

(54) AIR DIFFUSER FOR A HVAC SYSTEM

(75) Inventors: Vivek A. Jairazbhoy, Farmington Hills, MI (US); Mehran Shahabi, Ypsilanti, MI (US); Todd R. Barnhart, Royal Oak, MI (US)

(73) Assignee: Automotive Components Holdings, LLC, Dearborn, MI (US)

( * ) Notice: Subject to any disclaimer, the term of this patent is extended or adjusted under 35 U.S.C. 154(b) by 933 days.

(21) Appl. No.: 12/234,948

(22) Filed: Sep. 22, 2008

(65) Prior Publication Data
US 2010/0074743 A1    Mar. 25, 2010

(51) Int. Cl.
*F03B 3/18* (2006.01)
(52) U.S. Cl. ............................ 415/211.2; 415/119
(58) Field of Classification Search ............ 415/211.2, 415/119
See application file for complete search history.

(56) References Cited

U.S. PATENT DOCUMENTS

| | | | | |
|---|---|---|---|---|
| 3,113,593 A * | 12/1963 | Vicard | ........................ | 138/39 |
| 3,883,268 A * | 5/1975 | Evans et al. | ................ | 416/223 R |
| RE29,128 E * | 2/1977 | Sohre | ........................ | 239/289 |
| 4,078,870 A * | 3/1978 | Keller et al. | ................. | 415/53.1 |
| 4,958,504 A * | 9/1990 | Ichikawa et al. | ................. | 62/244 |
| 5,095,714 A | 3/1992 | Adachi et al. | | |
| 5,123,811 A | 6/1992 | Kuroiwa | | |
| 6,071,070 A * | 6/2000 | Yamamoto et al. | .......... | 415/53.1 |
| 6,139,259 A * | 10/2000 | Ho et al. | ........................ | 415/119 |
| 6,179,708 B1 * | 1/2001 | Yamamoto et al. | .......... | 454/153 |
| 6,409,469 B1 * | 6/2002 | Tse | ........................ | 415/119 |
| 6,764,276 B2 * | 7/2004 | Mulcaire et al. | ............. | 415/119 |
| 6,997,676 B2 * | 2/2006 | Koshoffer | ..................... | 415/115 |
| 6,997,686 B2 | 2/2006 | Agrawal et al. | | |
| 7,008,180 B2 * | 3/2006 | Fujimori et al. | ............ | 415/121.2 |
| 2002/0172588 A1 * | 11/2002 | Ikeda et al. | ................. | 415/53.1 |
| 2003/0035723 A1 * | 2/2003 | Decker et al. | ............. | 415/211.2 |
| 2003/0152459 A1 * | 8/2003 | Gliebe | ..................... | 415/211.2 |
| 2003/0228214 A1 * | 12/2003 | McBride | ..................... | 415/191 |
| 2004/0062634 A1 * | 4/2004 | Yu et al. | ..................... | 415/55.4 |
| 2004/0071549 A1 * | 4/2004 | Kim et al. | ..................... | 415/204 |
| 2004/0219079 A1 | 11/2004 | Hagen et al. | | |
| 2005/0111974 A1 * | 5/2005 | Loringer et al. | ............ | 415/211.2 |
| 2006/0171803 A1 * | 8/2006 | Senba | ..................... | 415/206 |

* cited by examiner

*Primary Examiner* — Teresa M Arroyo
(74) *Attorney, Agent, or Firm* — MacMillan, Sobanski & Todd, LLC

(57) ABSTRACT

A diffuser for carrying air flow to an evaporator in an air conditioning system of an automotive vehicle includes an inlet and an outlet, a wall extending between the inlet and the outlet, and a guide vane, extending at least partially between the inlet and the outlet, spaced from the wall by a containing a control region whose area ratio changes along a length of the guide vane.

7 Claims, 5 Drawing Sheets

AIR DIFFUSER FOR A HVAC SYSTEM

BACKGROUND OF THE INVENTION

1. Field of the Invention

This invention relates generally to an apparatus for promoting the uniform distribution of air in a diffuser and evaporator of an air conditioning system. More particularly the invention pertains to the shape, orientation and location of diffuser guide vanes.

2. Description of the Prior Art

The blower/scroll in an automotive heating ventilation and air conditioning (HVAC) system produces high speed, non-uniform flow that tends to produce high flows on the outer periphery due to centrifugal forces. Generally the cross sectional area of the scroll outlet is small (compared to that of the evaporator inlet), the air velocity at the scroll outlet is high (about 25 m/sec.), and the flow is directed in an arcuate path as it leaves the scroll. These factors cause a flow speed gradient, in which air speed is greatest near the outer wall of the scroll and lowest near its inner wall.

Uniform velocity distribution at a diffuser outlet and in the evaporator is important to ensure efficient evaporator performance, higher air flow, and possible reduced noise generation as the air passes through the evaporator core.

A variable blower control (VBC) module, an electronic controller located in the diffuser downstream of the scroll and a few inches upstream of the evaporator, requires high air speed across its surfaces in order to maintain the VBC adequately at a cool temperature. The VBC module's heat load is about 70 watts when the blower is operating. Furthermore, the presence of the VBC module in the diffuser may have an adverse effect on uniform air speed within the diffuser and evaporator.

A need exists in the industry for an air diffuser that produces uniform velocity distribution of air entering an evaporator, a high rate of air flow, a reduction in noise generation as the air passes through the evaporator core, and that is able to meet or exceed minimum evaporator coverage specifications.

SUMMARY OF THE INVENTION

A diffuser for carrying air flow to an evaporator in an air conditioning system of an automotive vehicle includes an inlet and an outlet, a wall extending between the inlet and the outlet, and a guide vane, extending at least partially between the inlet and the outlet, spaced from the wall by a containing a control region whose area ratio changes along a length of the guide vane.

A second guide vane, which extends at least partially between the inlet and the outlet, is spaced from the first guide vane by second a gap that changes along the second guide vane.

Gaps between adjacent guide vanes and between a guide vane and a diffuser wall determine the size of inlet and outlet flow area, which accelerate or decelerate the flow along the control region, thereby producing a uniform flow velocity distribution in the diffuser.

The guide vanes produce uniform velocity distribution of the air entering the evaporator, minimize pressure losses, reduce noise generation as the air passes through the evaporator core, and produce a uniform coverage of air across the evaporator.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which.

DESCRIPTION OF THE PREFERRED EMBODIMENT

Figure 1:
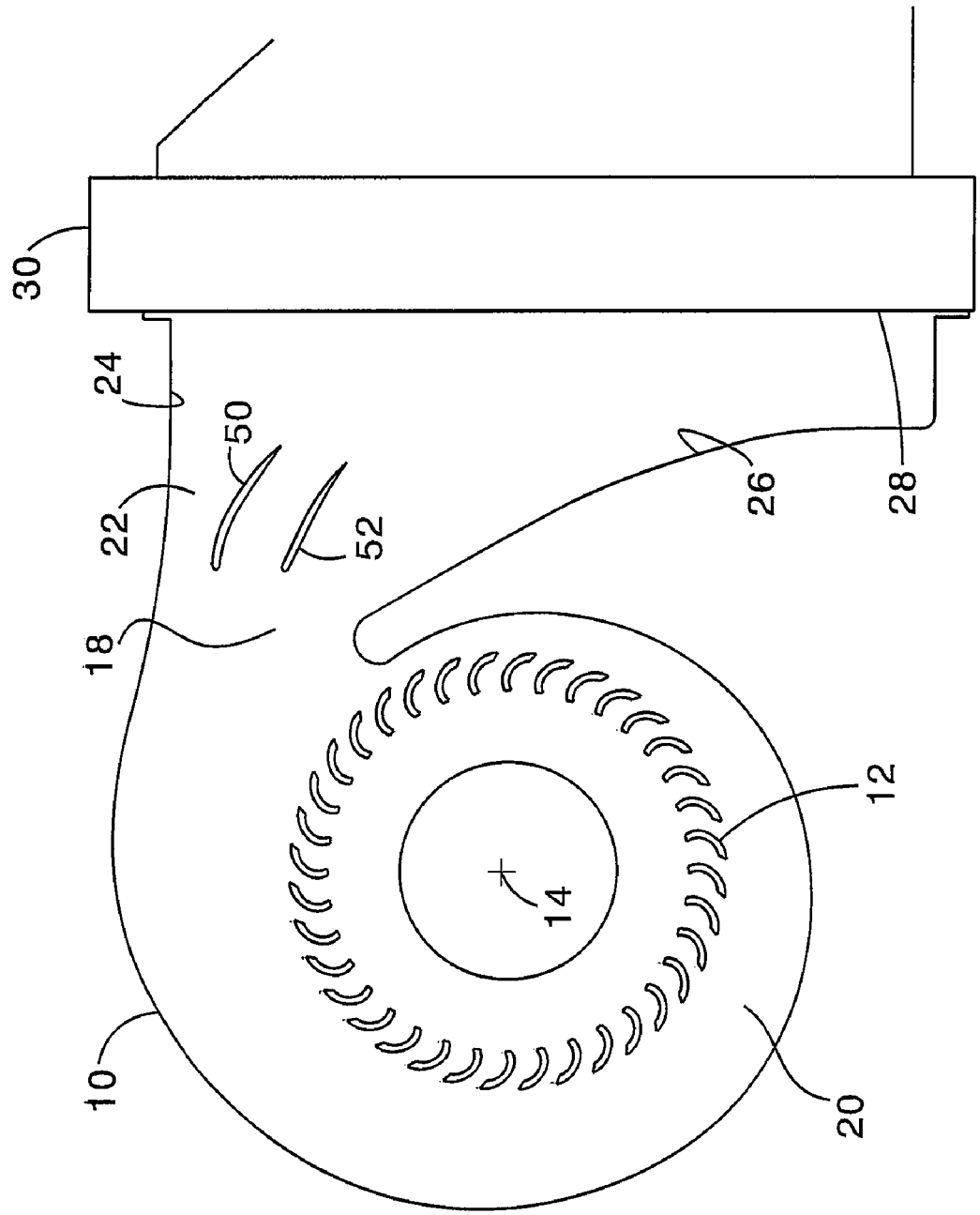
FIG. 1 is a schematic diagram showing a blower, diffuser and evaporator of an automotive HVAC system.

FIG. 1 shows a portion of flow path for an automotive air handling system. a scroll 10 containing a bladed wheel 12 supported for rotation about an axis 14 for pumping air from an entrance to an exit 18 along a volute path 20 whose cross-sectional flow area increases along its length. Air exiting the scroll 10 through exit 18 enters a diffuser 22 located immediately downstream from the scroll.

The cross sectional flow area of diffuser 22 increases rapidly between diffuser walls 24, 26 along the length of the diffuser. The diffuser exit 28 is connected to an evaporator 30.

Figure 2:
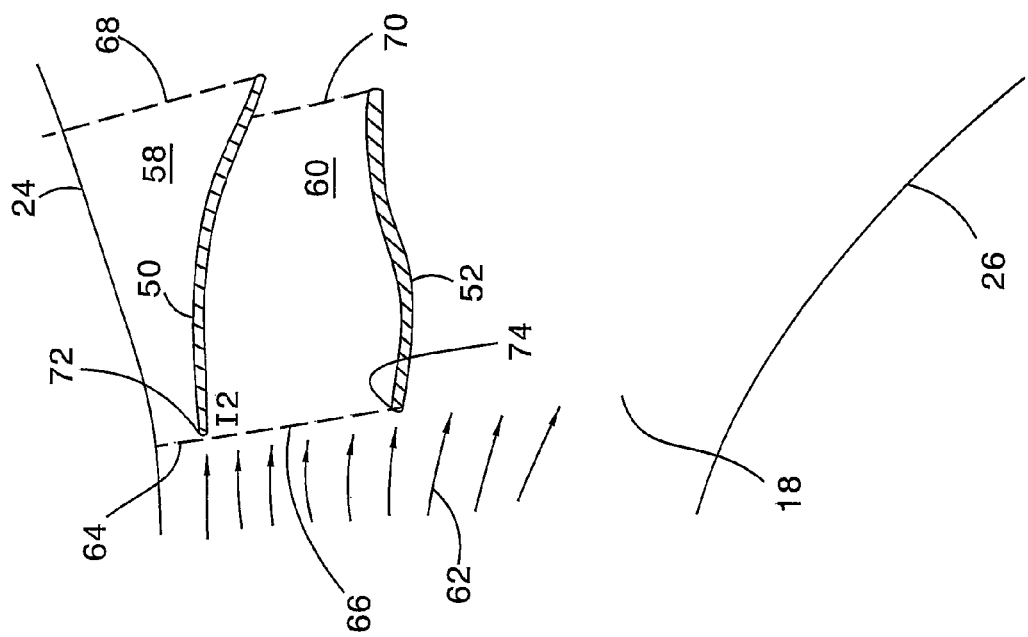
FIG. 2 is schematic diagram showing a top view of guide vanes located in the diffuser of FIG. 1.

FIG. 2 shows diffuser guide vanes 50, 52 used to produce a gradual change in the flow area between an adjacent guide vane or between a guide vane and an adjacent wall 24, 26 of the diffuser 22 in a zone known as the control region 58. The guide vanes 50, 52 either (a) gather air flow from a high velocity region and use a gradual increase in flow cross-sectional area to reduce flow velocity as in control region 58; or (b) gather air flow from a low velocity region and use a gradual decrease in flow cross-section to increase flow velocity, as in control region 60, thus reducing or eliminating local low and high velocity regions of the flow.

In FIG. 2, flow velocity and flow direction are represented by vectors 62. Air enters the diffuser 22 through inlets 64, 66, and air exits the diffuser through outlets 68, 70.

For reasons of streamlining air flow, minimizing pressure losses, and reducing noise, guide vanes 50, 52 are best positioned with their entrance walls 72, 74 substantially parallel to the flow, although a slightly convergent entrance angle between neighboring vanes or between a vane and its adjacent diffuser wall, with respect to the streamlines at the vane near the entrance may be acceptable.

Figure 3:
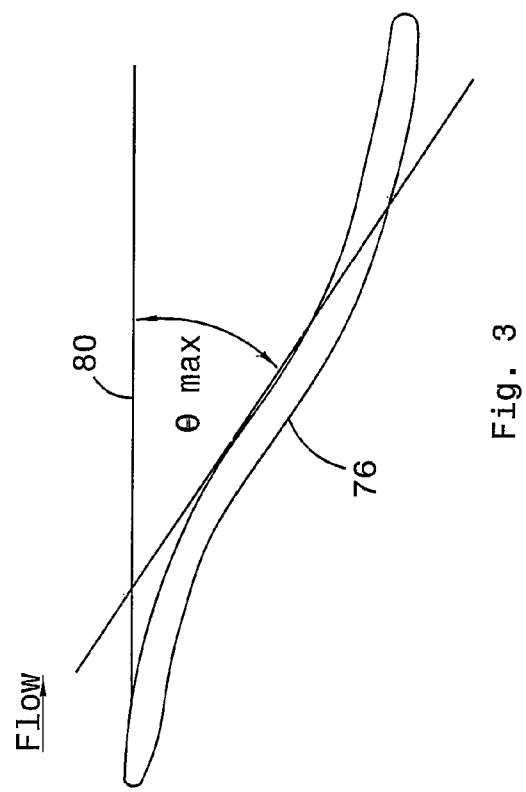
FIG. 3 is top view of a curved diffuser guide vane.

To alter the flow cross-sectional area and hence the flow velocity along the length of guide vanes 50, 52, the vanes are curved in the control regions 58, 60. Numerical experiments indicate that, when constrained by die draw, a curved vane 76, as shown in FIG. 3 having a maximum angle $\theta_{max}$ occurring somewhere along the vane 76 of at least eight degrees between the local tangent plane and the tangent plane 80 at the upstream end, such as at an inlet 64, 66, is best.

Although a curved guide vane 76 is an effective means of providing a change in flow cross-sectional area, it can often generate undesirable recirculation, particularly downstream of the guide vane. This tendency can be reduced by designing the guide vane to have a curvature whose slope changes from positive to negative somewhere along the guide vane length, resulting in an S-shaped guide vane 52, 76. The flow exiting the control region 58, 60 can be better directed toward the desired section of the entrance 28 of evaporator 30.

The control parameter that determines the effectiveness of a control region 58, 60, with regard to the acceleration or deceleration of the flow, is the area ratio $A_R$, i.e., the ratio of the inlet area of the control region to the outlet area of the control region. In FIG. 2, the area ratio for control region 60 is $A_R>1.4$, which causes the flow from inlet 66 to outlet 70 to accelerate along guide valves 50 and 52. The area ratio for control region 58 is $A_R<0.95$, which causes the flow from inlet 64 to outlet 68 to decelerate along guide vane 50 and diffuser wall 54.

Figure 4:
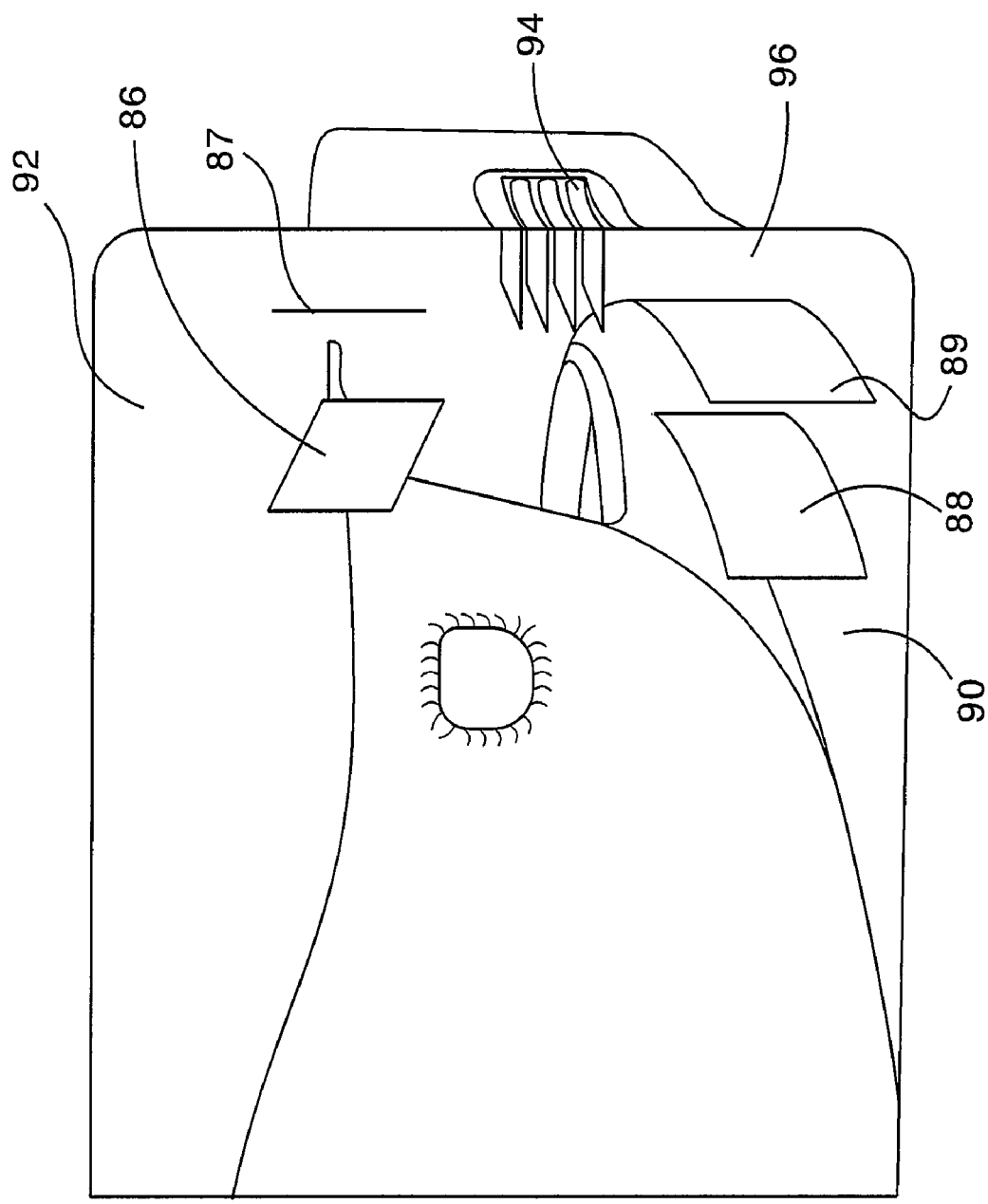
FIG. 4 is a perspective view showing the interior of a diffuser with guide vanes secured to the inner surface of the diffuser.

Ideally, guide vanes 50, 52 should be at least 20 mm high to significantly affect the flow. Often, the flow pattern in the upper section of the diffuser 22 is different from that in the lower section, due to the vertical positioning of the blower scroll 10. In such instances, as shown in FIG. 4, one set of guide vanes 86, 87 may extend downward from the diffuser ceiling, and a second set of guide vanes 88, 89 may extend upward from the diffuser floor 90. Each set of guide may be designed to redistribute flow laterally in a manner that accounts for the flow characteristics in its own section. Subject to manufacturing constraints, guide vanes could also extend from the diffuser floor 90 to its ceiling 92.

Figure 5:
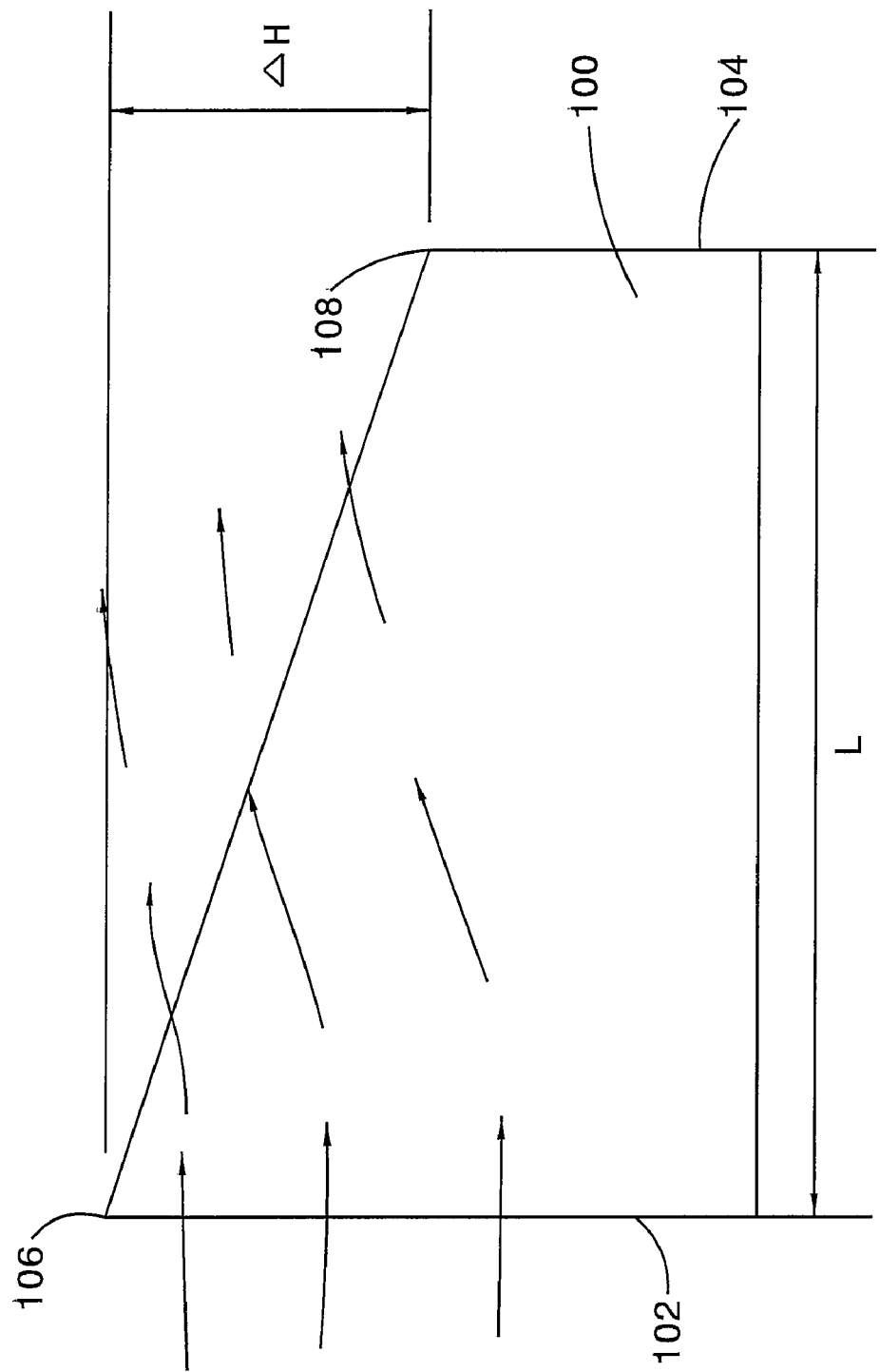
FIG. 5 is a side view of a diffuser guide vane having a variable height.

In some instances, particularly when a flow obstruction, such as the heat sink of an electronic module 94 centrally mounted on a side wall 96 of the diffuser 22 is being cooled by the air stream in the diffuser 22, low flow velocities may be observed in the central portion of the diffuser. Guide vanes 100 of variable height may be used to distribute air toward this central portion. As shown in FIG. 5, the height of guide vane 100 tapers from the upstream end 102 of the vane to the downstream end 104. Air tends to flow over or under the vane 100, altering the velocity distribution accordingly. The control parameter that determines the effectiveness of the redistribution is the Aspect Ratio Variation, i.e., $R=\Delta H/L$, where $\Delta H$ is the difference between the maximum vane height 106 and the minimum vane height 108 anywhere along the length of the vane, and L is the vane length measured along the axis of the vane. Values of R between 0.2 and 1.0 work best.

The rapid expansion path provided by the diffuser 22 leaves the flow prone to recirculation, typically driven by the tendency for the flow to be forced centrifugally towards the outer wall of the diffuser 22. Since they work against this natural tendency, guide vanes, are particularly susceptible to creating recirculation where the flow exits the control region 58, 60. Extending guide vanes to within 20 mm (or less) of the front face 28 of the evaporator core 30 cramps the space available for the development of a recirculation path, thus mitigating this undesirable flow feature.

When molding of the guide vanes is not the preferred manufacturing process, die draw is no longer a constraint, and horizontal or oblique guide vanes may be possible.

Typically, the diffuser 22 is defined as the expanding region immediately downstream of the scroll 10, beginning at the cut-off. Guide vanes are permitted to straddle the scroll and the diffuser. In principle, guide vanes could exist within the scroll. When the guide vanes are located there, however, their direct effect on evaporator core velocity distribution is harder to control.

When molding is the preferred manufacturing process, die draw is a constraint. Typically, die draw constraints require vertically oriented guide vanes, which are best used to control lateral flow distribution, but not quite as effective in redistributing mal-distributed air from top to bottom, often related to the vertical positioning of the blower scroll. The best way to complement the lateral distribution capability of guide vanes is to contour the ceiling or the floor of the diffuser slightly inward, i.e. towards the flow domain, upstream of the expanding section, forcing the flow away from the high flow region.

Here we adopt the convention that a curvature is taken to be positive if the curve turns in the same direction as the surface's chosen normal, otherwise the curvature is negative. We arbitrarily pick the normal direction to point into the duct of diffuser 22, shown in FIG. 6. We define the term "convex inward curvature" to mean bulging outward from the duct, i.e., positive, and the term "concave inward curvature" to mean bulging inward into the duct, i.e., negative.

Due to centrifugal effects, low flow velocity is often present at the inside wall of the diffuser. Since there is rapid expansion of a roughly rectangular cross-section in the diffuser, the corners of the diffuser in close proximity with the corners of the evaporator core also have low flow velocity, doubly compounding the problem on corners adjacent to the inside wall.

Figure 6:
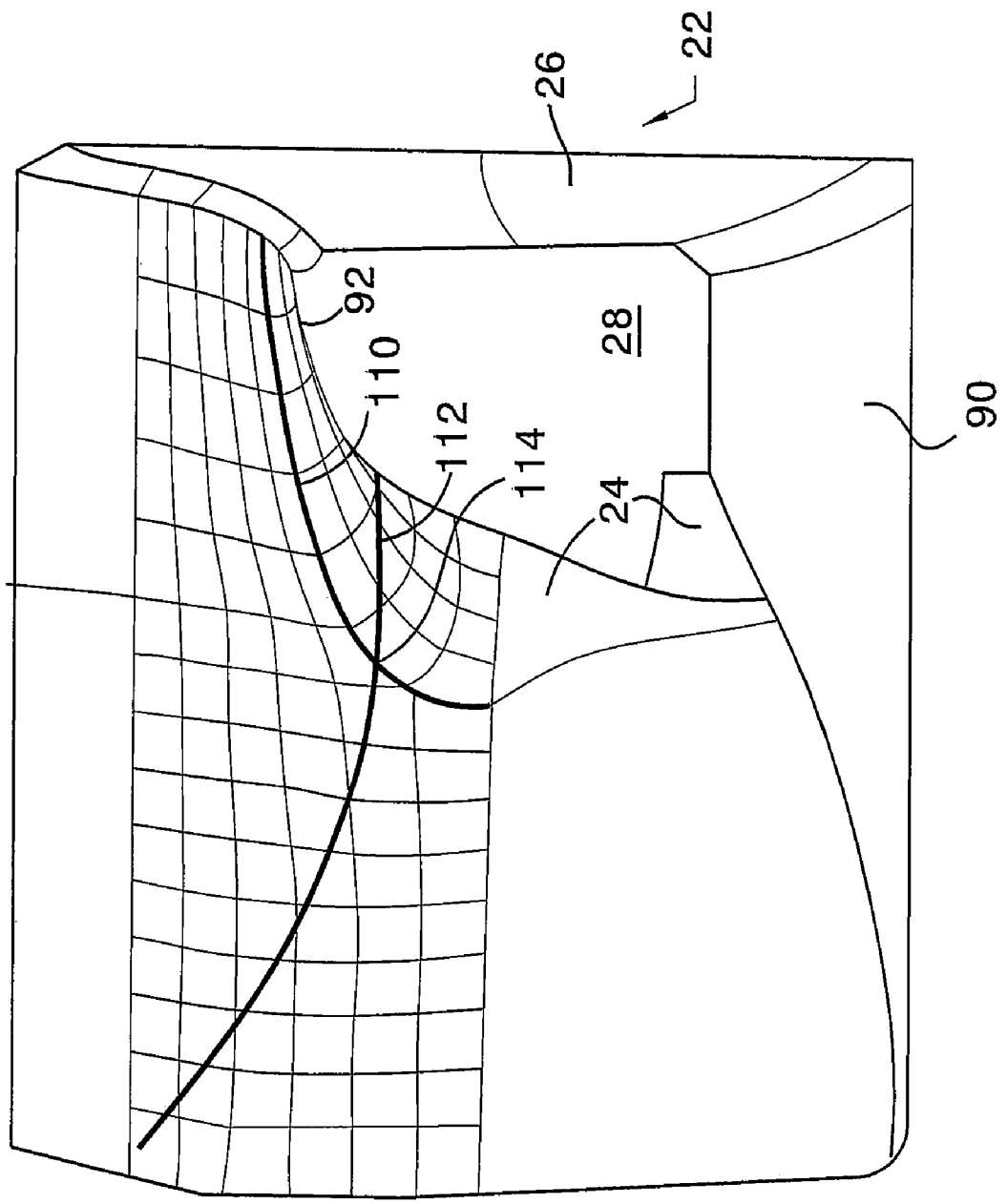
FIG. 6 is a perspective view showing a nonrectangular diffuser duct leading to an exit.

One means to alleviate the problem is to design the inner diffuser wall to have a gentle convex inward curvature 110 (as opposed to a nominally radiused edge where the inner wall 24 meets the ceiling 92) transverse to the streamwise direction to complement the concave inward curvature 112 that aids the smooth expansion of the cross-section, as shown in FIG. 6. The cross-section of diffuser 22 is not rectangular. The inner wall 24 and ceiling 92 exhibit a convex inward curvature 110 in the transverse direction and a concave inward curvature 112 in the streamwise direction.

The intersection 114 of surfaces 110 and 112 is a saddle point. The ceiling 92 and inner side wall 24 of diffuser 22 are locally saddle, i.e., with a convex inward curvature in a direction transverse to the direction of air flow in the duct and concave inward curvature in the direction of the air stream in the duct.

For a two-dimensional surface embedded in $R^3$ consider the intersection of the surface with a plane containing the normal vector and one of the tangent vectors at a particular point. This intersection is a plane curve and has a curvature. This is the normal curvature, and it varies with the choice of the tangent vector. The maximum and minimum values of the normal curvature at a point are called the principal curvatures, $k_1$ and $k_2$, and the directions of the corresponding tangent vectors are called principal directions.

The Gaussian curvature is equal to the product of the principal curvatures, $k_1 k_2$. It has the dimension of $1/\text{length}^2$. It determines whether a surface is locally convex when it is positive, or locally saddle when it is negative.

In accordance with the provisions of the patent statutes, the preferred embodiment has been described. However, it should be noted that the alternate embodiments can be practiced otherwise than as specifically illustrated and described.

The invention claimed is:

1. A diffuser for carrying air flow to an evaporator in an air conditioning system of an automotive vehicle, comprising:
   an inlet;
   an outlet located downstream from the inlet;
   a wall extending between the inlet and the outlet; and
   a guide vane including a surface that extends at least partially between the inlet and the outlet, spaced from the wall by a control region whose area ratio changes along a length of the guide vane, and having a height that changes along a length of the guide vane such that a ratio of a difference between a maximum height and a minimum height of the guide vane, and a length of the guide vane is in a range between 0.2 and 1.0.

2. The diffuser of claim 1 further comprising:
a second guide vane extending at least partially between the inlet and the outlet, spaced from the guide vane by a second control region whose area ratio changes along a length of the second guide vane.

3. The diffuser of claim 1 wherein a first tangent to a surface of the guide vane at the inlet end and a second tangent to a surface of guide vane along a length of the guide vane produce an angle of at least eight degrees.

4. The diffuser of claim 1 wherein a surface of the guide vane has a curvature that changes between convex and concave such that at least a portion of the guide vane has a S-shape.

5. The diffuser of claim 1 wherein a surface of the guide vane is substantially parallel to the flow at the inlet.

6. The diffuser of claim 1 wherein the guide vane is secured to an upper surface.

7. The diffuser of claim 1 wherein the guide vane is secured to a lower surface.

* * * * *